(No Model.)

R. T. TORKELSON.
BALL BEARING.

No. 428,577. Patented May 20, 1890.

Witnesses
Chas. F. Schmelz,
Rufus B. Fowler

Inventor
Reinhard T. Torkelson

UNITED STATES PATENT OFFICE.

REINHARD T. TORKELSON, OF HATFIELD, MASSACHUSETTS.

BALL-BEARING.

SPECIFICATION forming part of Letters Patent No. 428,577, dated May 20, 1890.

Application filed January 22, 1890. Serial No. 337,729. (No model.)

*To all whom it may concern:*

Be it known that I, REINHARD T. TORKELSON, of Hatfield, in the county of Hampshire and State of Massachusetts, have invented a new and useful Improvement in Ball-Bearings, of which the following is a specification, reference being had to the accompanying drawings, representing the bearing of a bicycle and showing the application of my invention thereto.

Figure 1:
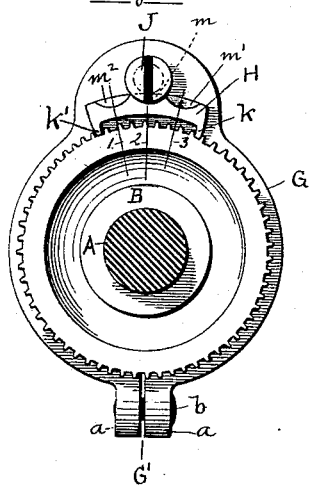
Figure 2:
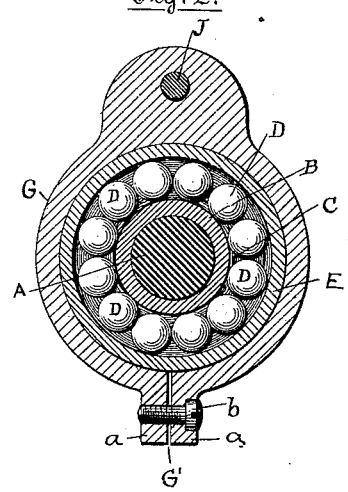
Figure 3:
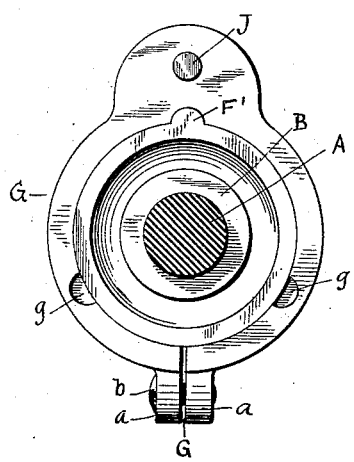
Figure 4:
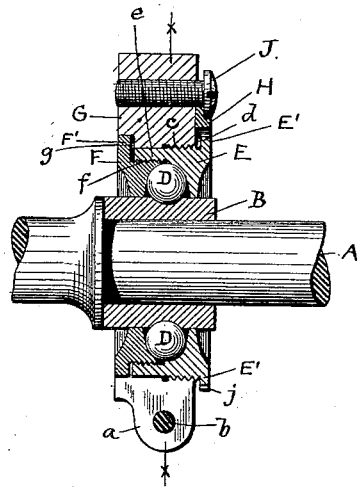

Figure 1 represents a side view of a bicycle-bearing, the shaft being shown in section. Fig. 2 is a sectional view on line X X, Fig. 4. Fig. 3 is a side view showing the opposite from that shown in Fig. 1. Fig. 4 is a sectional view on line Y Y, Fig. 3.

Similar letters refer to similar parts in the different figures.

My invention relates to a ball-bearing adapted to that class of bearings in which the pressure is exerted radially to the shaft; and it has for its object to secure an accurate adjustment of the bearing by which the lost motion resulting from wear or other causes can be taken up upon both sides of the row of balls, thereby preventing their lateral displacement, and causing the pressure upon the balls to be received in a line coincident with the radii of the shaft.

In the accompanying drawings, wherein my invention is shown with reference to its use in a cycle-bearing, A denotes the shaft, with a sleeve B driven upon the shaft or attached by means of a screw-thread or otherwise, so it will turn with the shaft A, and having a shallow groove or channel C fitting the spherical surface of the balls D, which are arranged around the sleeve B, in the manner usual in ball-bearings, and inclosed between the collars E and F. The collars E and F are surrounded by the case or box G, which in the present instance is open at G' and provided with the ears $a$ $a$ and screw $b$, by which the box is clamped upon the collar E. The collar E is screw-threaded at $c$, fitting a screw-threaded section $d$ in the box G, and the inner surface of the collar E is screw-threaded at $e$, fitting a screw-threaded section $f$ upon the outer surface of the collar F. The collar F has a projecting lug F', fitting any of the corresponding recesses $g$ in the side of the box G; or, if preferred, the collar F can have a series of equidistant lugs arranged to enter the same number of equidistant recesses in the box G, in order to hold the collar from turning within the box during the adjustment of the bearing, and also to permit the collar to be partially turned around to bring a different section in position to receive the pressure, and thereby equalize the wear upon the collar. The screw-threaded sections $e$ and $f$ of the collars E and F are double the pitch of the screw-threaded section $c$ in the collar E, so that by the rotation of the collar E toward the right in the fixed box G it is moved toward the balls D a distance determined by the pitch of the screw-thread $c$, carrying the collar F an equal distance away from the balls D; but as the collar F is held from turning in the box G by means of the lug F' being held in one of the recesses $g$ the rotation of the collar E will draw the collar F into the collar E and toward the balls D a distance equal to twice the lateral movement of the collars caused by the action of the screw-threads $c$ and $d$. The movement of the two collars E and F toward or away from the balls D will therefore be equal, keeping the annular row of balls D in true alignment with the groove C in the sleeve B and maintaining an equal pressure of both collars upon the balls and in a direction radially to the shaft A.

The collar E has a flange E', provided with teeth $j$, and the collar is held from turning or working loose by means of a dog, consisting of a plate H, resting against the side of the box G, and having the prongs $k$ $k'$ fitted to enter the spaces between the teeth $j$. The edge of the plate passes beneath the head of the screw J, held in the box G, with its head entering one of the countersunk recesses $m$ $m'$ $m^2$ in the plate H, binding the plate against the side of the box G and holding it from lateral movement.

When the plate H is held by the insertion of the screw-head J in the central countersink $m$, the collar E can be moved around the shaft A a distance equal to a single tooth $j$ or the multiple of a tooth; but in order to allow of a finer adjustment of the collar E, I make the distance between the countersinks $m$ and $m'$ and $m$ and $m^2$ equal to a definite number of teeth and a fractional part of a tooth, which enables the collar E to be moved the space of half a tooth, and held by moving the plate H along to bring the screw-head into the countersink $m'$, and the space of one-quarter of a tooth by bringing the screw J into the countersink $m^2$, and in changing the plate from one recess to the other it is only necessary to withdraw the screw sufficiently to remove it from the countersunk recess.

What I claim as my invention, and desire to secure by Letters Patent, is—

1. In a ball-bearing, the combination, with a shaft and a series of balls arranged around said shaft and running upon a way or track, of an annular collar capable of being rotated about said shaft and provided with an inner inclined surface arranged to bear against said balls and having an external screw-thread entering a screw-thread in a fixed shell or box, and having an internal screw-thread engaging a screw-thread upon an annular collar upon the opposite side of said balls, an inclosing shell or box having a screw-thread engaging the screw-thread upon said rotating collar, and an annular collar held from rotating and provided with an inner inclined surface arranged to bear against said balls, and having a screw-thread engaging the internal screw-thread on the rotating collar, all arranged and operating substantially as described.

2. In a ball-bearing, the combination, with a shaft and a series of balls, of a fixed box or inclosing-case, a collar capable of moving in a line parallel with the axis of the shaft, but held from rotation, a collar capable of moving in a line parallel with the axis of the shaft, but capable of rotation around said shaft, said collars having inclined surfaces bearing against said balls, and being operatively connected with each other and said fixed case or box by means of screw-threads having a different pitch, substantially as described, whereby said collars are moved simultaneously by the rotation of said rotating collar, substantially as described..

3. In a ball-bearing, the combination, with a shaft and a series of balls, of the collars E and F and fixed case or box G, having a series of recesses $g$ $g$ $g$, and a projecting lug $E'^{\prime\prime}$ on the collar F, arranged to enter either of said recesses, whereby the collar can be partially turned in order to subject a different bearing-surface to the pressure of the load, substantially as described.

4. In a ball-bearing, the combination, with a toothed collar capable of rotating for the purpose of adjusting the ball-bearing, substantially as described, and a fixed shell or box, of a dog-plate having prongs $k$ $k'$ engaging said toothed collar, countersunk recesses $m$ $m'$ $m^2$, and a binding-screw J, with its head entering one of said recesses, said recesses being arranged at different distances apart and varying by the fractional part of a tooth on said collar, as and for the purpose set forth.

5. The combination, with a shaft and a series of balls arranged around said shaft and running upon a way or track, of the shell or box G, having a screw-thread $d$, an annular collar E, having screw-threads $c$ and $e$, an annular collar F, having a screw-thread $f$ and being held from rotation, said collars being provided with inclined surfaces bearing against said balls, and the screw-thread between the collar E and the shell or box G being of a different pitch from the screw-thread between the collar E and the collar F, whereby both collars are simultaneously and equally moved by the rotation of the collar E, substantially as described.

REINHARD T. TORKELSON.

Witnesses:
RUFUS B. FOWLER,
WALTER S. BOWEN.